United States Patent
Masuda (10) Patent No.: US 9,599,883 B2
(45) Date of Patent: Mar. 21, 2017

(54) LIGHT SOURCE UNIT INCLUDING LUMINESCENT PLATE ON TO WHICH EXCITATION LIGHT FROM EXCITATION LIGHT SOURCE IS SHONE AND PROJECTOR INCLUDING THE LIGHT SOURCE UNIT

(71) Applicant: CASIO COMPUTER CO., LTD., Shibuya-ku, Tokyo (JP)

(72) Inventor: Hiroki Masuda, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 55 days.

(21) Appl. No.: 14/664,477

(22) Filed: Mar. 20, 2015

(65) Prior Publication Data
US 2015/0346593 A1 Dec. 3, 2015

(30) Foreign Application Priority Data

Jun. 2, 2014 (JP) .................................. 2014-113689
Feb. 4, 2015 (JP) .................................. 2015-019824

(51) Int. Cl.
*G03B 21/20* (2006.01)

(52) U.S. Cl.
CPC ........ *G03B 21/204* (2013.01); *G03B 21/2013* (2013.01)

(58) Field of Classification Search
CPC .. G03B 21/008; G03B 21/204; G03B 21/208; G03B 21/2013; H04N 9/3158; H04N 9/3161
See application file for complete search history.

(56) References Cited

U.S. PATENT DOCUMENTS

| | | | |
|---|---|---|---|
| 2009/0034284 A1* | 2/2009 | Li | G03B 33/06 362/554 |
| 2010/0328617 A1* | 12/2010 | Masuda | G03B 21/14 353/31 |

(Continued)

FOREIGN PATENT DOCUMENTS

| | | |
|---|---|---|
| CN | 102023464 A | 4/2011 |
| JP | 2010198805 A | 9/2010 |

(Continued)

OTHER PUBLICATIONS

Chinese Office Action dated Sep. 26, 2016 (and English translation thereof), issued in counterpart Chinese Application No. 201510119253.5.

*Primary Examiner* — Sultan Chowdhury
(74) *Attorney, Agent, or Firm* — Holtz, Holtz & Volek PC (57) ABSTRACT

To provide a light source unit which can execute a projection with less consumed power and noise and a projector including this light source unit, a light source unit is provided which includes an excitation light source and a luminescent plate which includes a first luminescent light emitting area on which a resin mixed luminescent material layer containing a resin binder is provided and a second luminescent light emitting area on which a luminescent material containing no resin binder is provided, on to which first luminescent light emitting area and second luminescent light emitting area excitation light from the excitation light source is shone.

17 Claims, 5 Drawing Sheets

(56) References Cited

U.S. PATENT DOCUMENTS

| | | | |
|---|---|---|---|
| 2011/0116253 A1* | 5/2011 | Sugiyama | F21S 10/007 |
| | | | 362/84 |
| 2011/0304830 A1* | 12/2011 | Kato | G03B 21/204 |
| | | | 353/84 |
| 2012/0106126 A1* | 5/2012 | Nojima | G02B 26/008 |
| | | | 362/84 |
| 2013/0027671 A1 | 1/2013 | Miyazaki | |
| 2014/0211170 A1* | 7/2014 | Kitano | G03B 21/204 |
| | | | 353/31 |

FOREIGN PATENT DOCUMENTS

| | | |
|---|---|---|
| JP | 2012185980 A | 9/2012 |
| JP | 2013047793 A | 3/2013 |

\* cited by examiner

LIGHT SOURCE UNIT INCLUDING LUMINESCENT PLATE ON TO WHICH EXCITATION LIGHT FROM EXCITATION LIGHT SOURCE IS SHONE AND PROJECTOR INCLUDING THE LIGHT SOURCE UNIT

CROSS-REFERENCE TO RELATED APPLICATION

This patent application is based upon and claims the benefit of priority under 35 USC 119 from the prior Japanese Patent Applications No. 2014-113689 filed on Jun. 2, 2014 and No. 2015-019824 filed on Feb. 4, 2015, the entire disclosures of which, including the description, claims, drawings and abstract, are incorporated herein by reference.

BACKGROUND OF THE INVENTION

Field of the Invention

The present invention relates to a light source unit including a luminescent plate on to which excitation light from an excitation light source is shone and a projector including this light source unit.

Description of the Related Art

In these days, data projectors are used on many occasions as an image projection system which projects an image of a screen of a personal computer or a video image, as well as images based on image data which is stored on a memory card on to a screen. In these data projectors, light emitted from a light source is caused to converge to a micromirror display device called a DMD (Digital Micromirror Device) or a liquid crystal panel so that a full-color image is displayed onto a screen.

The Japanese Unexamined Patent Application No. 2013-47793 (Patent Literature 1) discloses a projector which includes an excitation light shining device which has blue laser diodes. Excitation light from this excitation light shining device is shone on to a luminescent material layer of a luminescent wheel, and light in the green wavelength range is emitted therefrom. The Japanese Unexamined Patent Application No. 2010-198805 (Patent Literature 2) discloses a projector which includes a light source unit in which excitation light is shone onto a plate-shaped luminescent material device which is formed by sintering an inorganic binder of a light transmitting inorganic material and a luminescent material to thereby obtain light in the green wavelength range. The Japanese Unexamined Patent Publication No. 2012-185980 (Patent Literature 3) discloses a wavelength changing device having a wavelength changing member made up of a sintered material of mixed powder which contains inorganic luminescent material powder and glass powder and a projector which includes this wavelength changing device.

In the projector disclosed by Patent Literature 1, in shining the excitation light on to the luminescent material layer, the luminescent wheel is driven to rotate by a motor, which generates noises such as a wind noise produced by the rotating luminescent wheel, a high-frequency noise produced by the drive motor, a noise produced by a cooling fan which cools the luminescent wheel, and the like. On the other hand, in the projectors disclosed by Patent Literature 2 and Patent Literature 3, when highly bright excitation light is shone on to the luminescent material, there may be a case where a burned damage is caused, and hence, there is a limit on increasing the brightness of luminescent light.

SUMMARY OF THE INVENTION

Thus, the invention has been made in view of these situations, and an object thereof is to provide a light source unit which enables a projection with less consumed power and noise and a projector including this light source unit.

According to an aspect of the invention, there is provided a light source unit having an excitation light source, and a luminescent plate which includes a first luminescent light emitting area on which a resin mixed luminescent material layer containing a resin binder is provided and a second luminescent light emitting area on which a luminescent material containing no resin binder is provided, on to which first luminescent light emitting area and second luminescent light emitting area excitation light from the excitation light source is shone.

According to another aspect of the invention, there is provided a projector having a light source unit having an excitation light source, and a luminescent plate which includes a first luminescent light emitting area on which a resin mixed luminescent material layer containing a resin binder is provided and a second luminescent light emitting area on which a luminescent material containing no resin binder is provided, on to which first luminescent light emitting area and second luminescent light emitting area excitation light from the excitation light source is shone, a display device on to which light source light from the light source unit is shone to thereby form image light, a projection side optical system which projects the image light emitted from the display device on to a screen, and a projector control unit which controls the display device and the light source unit.

DETAILED DESCRIPTION OF THE PREFERRED EMBODIMENTS

Figure 1:
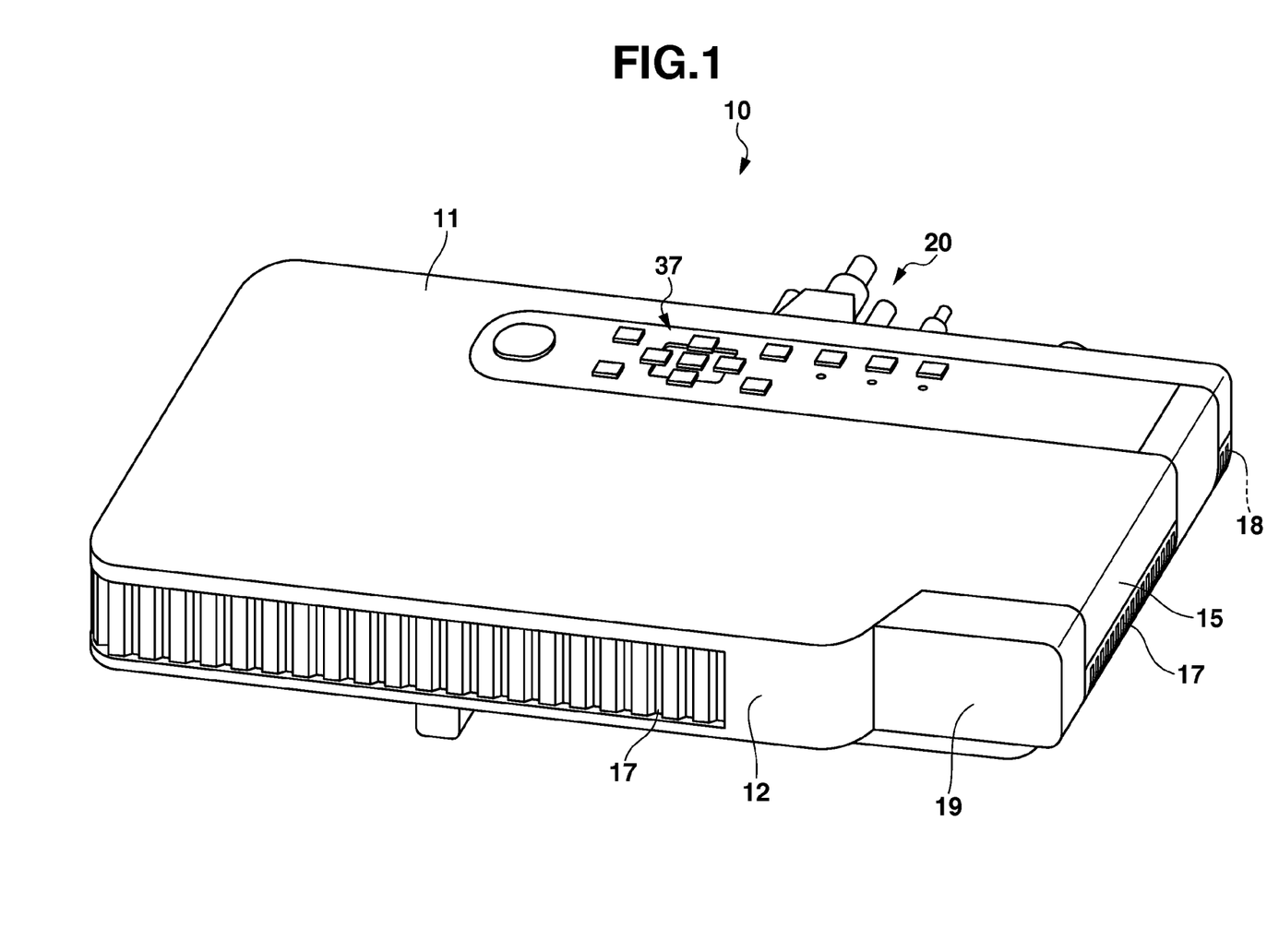
FIG. 1 is an external perspective view showing a projector according to an embodiment of the invention.

Hereinafter, embodiments of the invention will be described in detail by using the accompanying drawings. FIG. 1 is an external perspective view of a projector 10 according to an embodiment of the invention. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

As shown in FIG. 1, the projector 10 has a substantially rectangular parallelepiped shape. The projector 10 has a projection port to a side of a front panel 12 that is a front side panel of a casing of the projector 10, and this projection port is covered by a lens cover 19. A plurality of inside air outlet ports 17 are provided in the front panel 12. Further, although not shown, the projector 10 has an Ir reception unit which receives a control signal from a remote controller.

In addition, a keys/indicators unit 37 is provided on an upper panel 11 of the casing. Disposed on this keys/indicators unit 37 are keys and indicators which include a power indicator, a projection switch key, an overheat indicator, and the like. The power indicator informs whether a power switch key or a power supply is on or off. The projection switch key switches "on" or "off" of projection. The overheat indicator informs of an overheat condition occurring in a light source unit, a display device, a control unit or the like when they really overheat.

Further, an input/output connector unit where USB terminals, an image signal D-SUB terminal where analog RGB image signals are inputted, an S terminal, an RCA terminal, a voice output terminal and the like are provided and (a group of) various types of terminals 20 including a power supply adaptor plug are provided on a back panel 13 at the rear of the casing. Additionally, a plurality of outside air inlet ports are formed in the back panel 13. Additionally, pluralities of inside air outlet ports 17 are formed in a right side panel which is a side panel of the casing which is not shown, a left side panel 15 which is a side panel shown in FIG. 1 and the front panel 12. Outside air inlet ports 18 are also formed in a corner portion between the left side panel 15 and the back panel 13.

Figure 2:
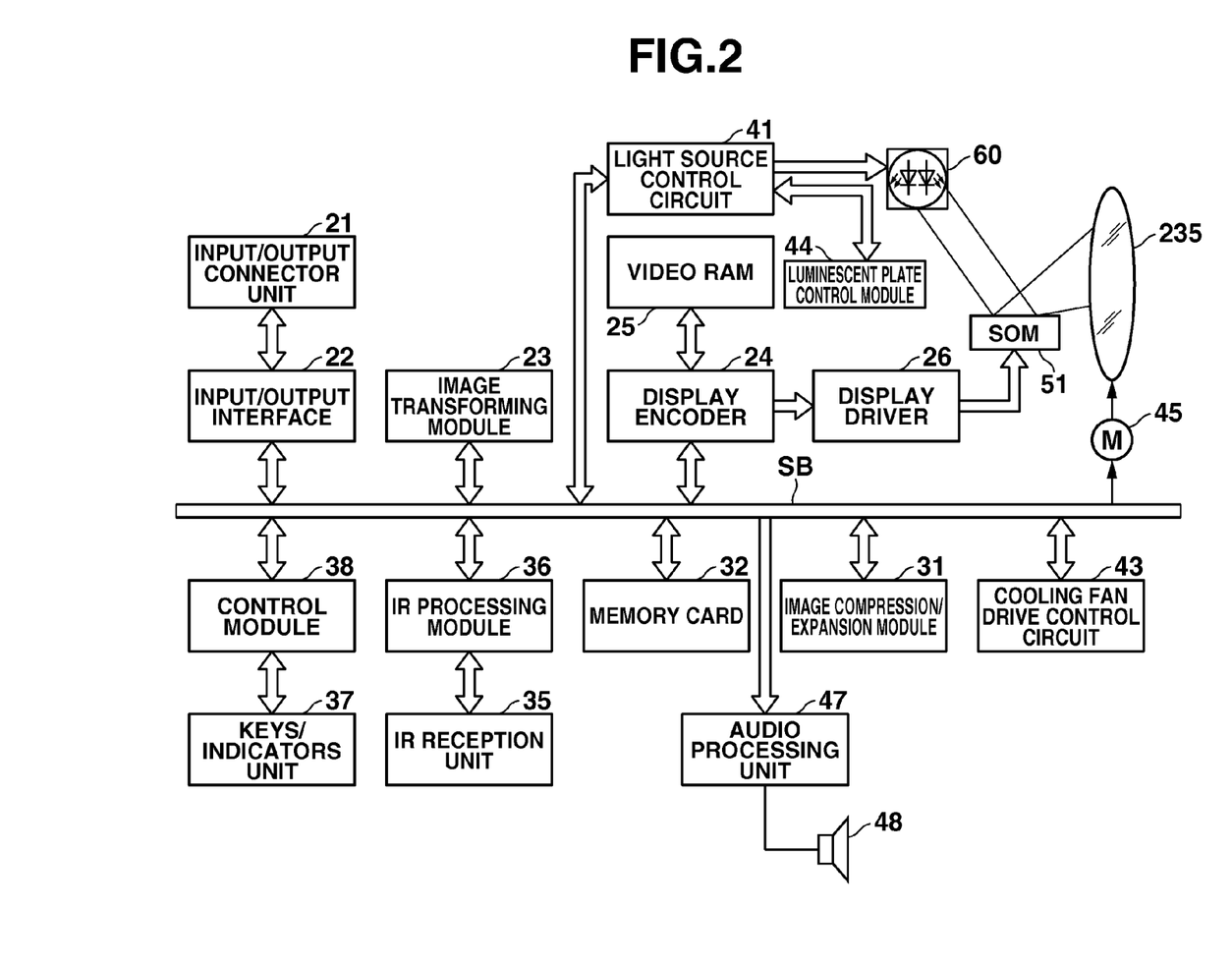
FIG. 2 is a functional block diagram of the projector according to the embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the image signal outputted from the display encoder 24.

In this projector 10, a pencil of light that is emitted from a light source unit 60 is shone on to the display device 51 via a light source side optical system which will be described hereinafter, whereby an optical image is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression/expansion module 31 reads out the image data recorded on the memory card 32 and expands individual image data that make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 that includes the main keys and indicators that are provided on the upper panel 11 of the casing are sent out directly to the control module 38. Key operation signals from the remote controller are received by the Ir reception unit 35, and cord signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls separately and individually the emission of lights in the red, green and blue wavelength ranges from the light source unit 60 so that the lights in the predetermined wavelength ranges which are required when an image is generated are emitted from the light source unit 60.

The light source control circuit 41 causes the red, green and blue lights to be emitted at a plurality of levels of brightness which correspond to a plurality of projection modes according to a setting to save energy and a peripheral environment of a projecting place. Additionally, the light source control circuit 41 is connected to a luminescent plate control module 44 which controls a luminescent plate device to make up a luminescent plate control device. The luminescent plate control device controls a luminescent plate according to the projection modes.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through a timer or the power supply to the projector 10 itself is turned off depending upon the results of the temperature detections by the temperature sensors.

Figure 3:
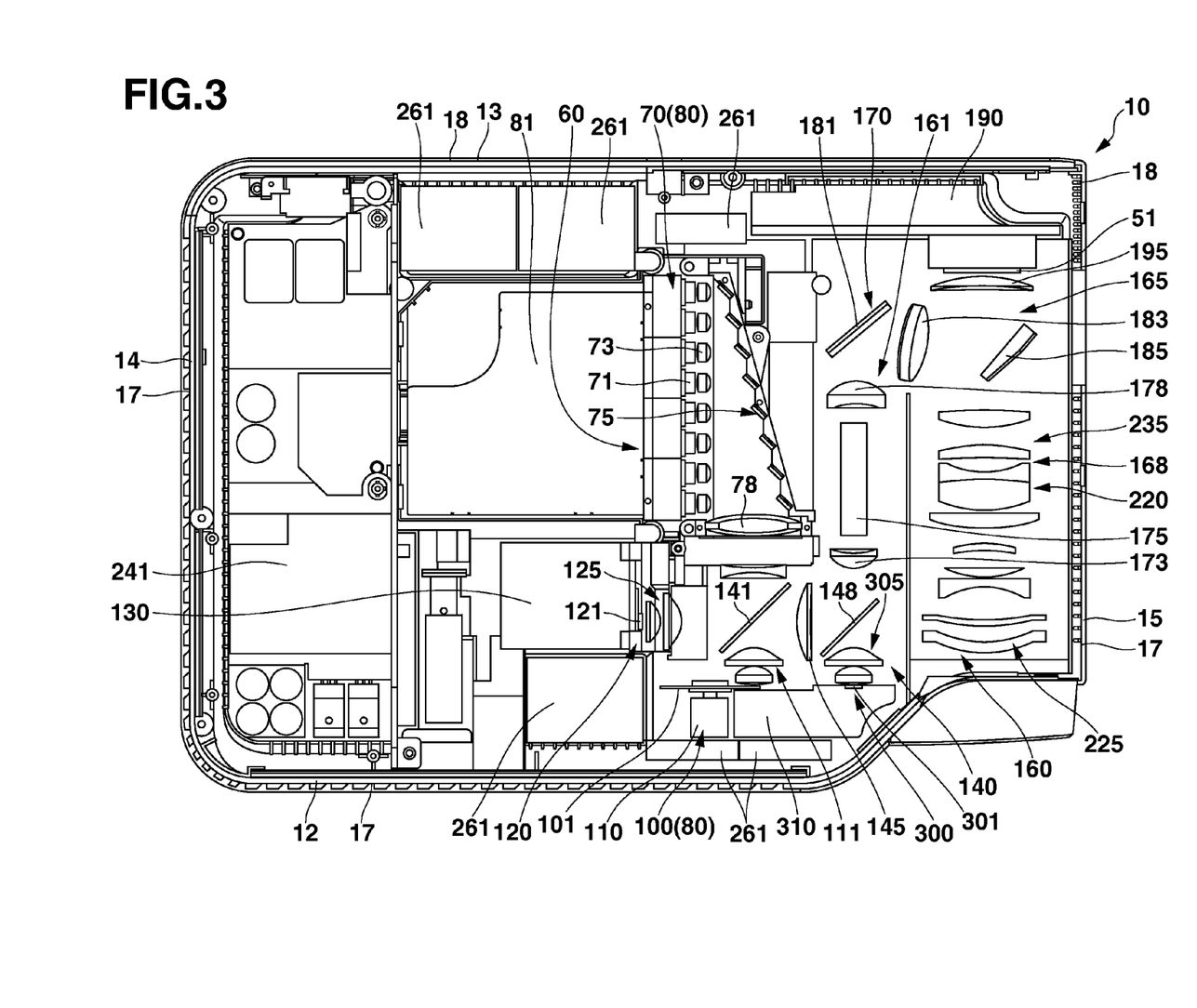
FIG. 3 is a schematic plan view showing an internal construction of the projector according to the embodiment of the invention.

Next, an internal construction of the projector 10 will be described based on what is shown in FIG. 3. FIG. 3 is a schematic plan view showing the internal construction of the projector 10. The projector 10 includes a control circuit board 241 near a right side panel 14. The control circuit board 241 includes a power supply circuit block, a light source control block and the like. The projector 10 includes the light source unit 60 to a side of the control circuit board 241, that is, in a substantially central portion of the casing of the projector 10. Further, the projector 10 includes a light source side optical system 170 and a projection side optical system 220 between the light source unit 60 and the left side panel 15.

The light source unit 60 includes a red light source device 120 which is a light source of light in the red wavelength range, a green light source 80 which is a light source of light in the green wavelength range, and a blue light source device 300 which is a light source of light in the blue wavelength range. The green light source device 80 is made up of an excitation light shining device 70, and a luminescent plate device 100 which includes a luminescent plate 101 such as a luminescent wheel or the like. Additionally, a light guiding optical system 140 is disposed in the light source unit 60, and this light guiding optical system 140 guides and emits lights in the red, green and blue wavelength ranges. Specifically, the light guiding optical system 140 collects lights in the red, green and blue wavelength ranges which are emitted from the red, green and blue light sources, respectively, to an incident port of a light tunnel 175 via a collective lens 173.

The excitation light shining device 70, which is an excitation light source in the green light source device 80, is disposed at a substantially central portion in a left-to-right direction of the casing of the projector 10 and near the back panel 13. The excitation light shining device 70 includes a light source group, a reflecting mirror group 75, a collective lens 78 and a heat sink 81. The light source group includes blue laser diodes 71 which are a plurality of semiconductor devices which are disposed so that their optical axes are parallel to the back panel 13. The reflecting mirror group 75 changes the direction of axes of lights emitted from the blue laser diodes 71 by 90 degrees in the direction of the front panel 12. The collective lens 78 collects lights emitted from the blue laser diodes 71 and reflected by the reflecting mirror group 75. The heat sink 81 is disposed between the blue laser diodes 71 and the right side panel 14.

In the light source group, the blue laser diodes 71 are arranged into a matrix configuration. Collimator lenses 73 are disposed individually on the optical axes of the blue laser diodes 71, and these collimator lenses 73 converts lights emitted from the blue laser diodes 71 into parallel lights so as to enhance the directivity thereof. The reflecting mirror group 75 is configured so that a plurality of reflecting mirrors are arranged like steps of a staircase and are integrated with a mirror base plate 76 so as to adjust the position thereof, whereby sectional areas of pencils of light emitted from the blue laser diodes 71 are reduced in one direction for emission to the collective lens 78.

A cooling fan 261 is disposed between the heat sink 81 and the back panel 13, so that the blue laser diodes 71 are cooled by this cooling fan 261 and the heat sink 81. Further, a cooling fan 261 is also disposed between the reflecting mirror group 75 and the back panel 13, so that the reflecting mirror group 75 and the collective lens 78 are cooled by this cooling fan 261.

The luminescent plate device 100 which makes up the green light source device 80 is disposed on an optical path of excitation light emitted from the excitation light shining device 70 and near the front panel 12. The luminescent plate device 100 includes a luminescent plate 101, a motor 110, and a collective lens group 111. The luminescent plate 101 is made up of a luminescent wheel or the like and is disposed so as to be parallel to the front panel 12, that is, so as to be at right angles to an axis of light emitted from the excitation light shining device 70. The motor 110 drives to rotate the luminescent plate 101. The collective lens group 111 collects the excitation light emitted from the excitation light shining device 70 onto the luminescent plate 101 and collects a pencil of light which is emitted from the luminescent plate 101 in the direction of the back panel 13. Namely, the luminescent plate 101 can be driven by the luminescent plate device 100 and is disposed within the casing of the projector 10. Additionally, a cooling fan 261 is disposed between the motor 110 and the front panel 12, so that the luminescent plate device 100 is cooled by this cooling fan 261.

The luminescent plate 101 includes a luminescent light emitting area which emits luminescent light which is light in the green wavelength range when excitation light is shone on to the luminescent light emitting area. This luminescent plate 101 will be described in detail later.

The red light source device 120 includes a red light source 121 which is disposed so that an optical axis thereof becomes parallel to the blue laser diodes 71 and a collective lens group 125 which collects light emitted from the red light source 121. This red light source device 120 is disposed so that the optical axis thereof intersects light emitted from the excitation light shining device 70 and light in the green wavelength range which is emitted from the luminescent plate 101. The red light source 121 is a red light emitting diode which is a semiconductor device which emits light in the red wavelength range. The red light source device 120 includes a heat sink 130 which is disposed on a side thereof which faces the right side panel 14. A cooling fan 261 is disposed between the heat sink 130 and the front panel 12, so that the red light source 121 is cooled by the cooling fan 261.

The blue light source device 300 includes a blue light source 301 which is disposed so as to be parallel to an axis of light emitted from the luminescent plate device 100 and a collective lens group 305 which collects light emitted from the blue light source 301. This blue light source device 300 is disposed so as to be at right angles to the axis of light emitted from the red light source device 120. The blue light source 301 is a blue light emitting diode which is a semiconductor device which emits light in the blue wavelength range. The blue light source device 300 includes a heat sink 310 which is disposed on a side of the blue light source 301 which faces the front panel 12. A cooling fan 261 is disposed between the heat sink 310 and the front panel 12, so that the blue light source 301 is cooled by this cooling fan 261.

The light guiding optical system 140 includes a collective lens which collects pencils of light in the red, green and blue wavelength ranges and dichroic mirrors which change the directions of axes of the red, green and blue lights so that the red, green and blue lights are directed in the same direction. Specifically, a first dichroic mirror 141 is disposed in a position where the axes of excitation light in the blue wavelength range which is emitted from the excitation light shining device 70 and light in the green wavelength range which is emitted from the luminescent plate 101 intersect the axis of light in the red wavelength range which is emitted from the red light source device 120. This first dichroic mirror 141 transmits excitation light in the blue wavelength range and light in the red wavelength range and reflects light in the green wavelength range so that the axis of the green light is changed by 90 degrees in the direction of the left side panel 15.

A second dichroic mirror 148 is disposed in a position where the axis of light in the blue wavelength range which is emitted from the blue light source device 300 intersects the axis of light in the red wavelength range which is emitted from the red light source device 120. This second dichroic mirror 148 transmits light in the blue wavelength range and reflects lights in the green and red wavelength ranges so that the axes of the green and red lights are changed by 90 degrees in the direction of the back panel 13. A collective lens 145 is disposed between the first dichroic mirror 141 and the second dichroic mirror 148.

Lights in the red, green and blue wavelength ranges are caused to be incident on the collective lens 173 of the light source side optical system 170 by the light guiding optical system 140 which is configured in the way described above. Specifically, excitation light emitted from the excitation light shining device 70 passes through the first dichroic mirror 141 and is shone on to the luminescent light emitting area of the luminescent plate 101 via the collective lens group 111. Light in the green wavelength range which is emitted from the luminescent plate device 100 is reflected by the first dichroic mirror 141 and is reflected by the second dichroic mirror 148 via the collective lens 145 to be incident on the collective lens 173.

Light in the red wavelength range which is emitted from the red light source device 120 passes through the first dichroic mirror 141 and is then reflected by the second dichroic mirror 148 via the collective lens 145, whereafter the red light is allowed to be incident on the collective lens 173. Light in the blue wavelength range which is emitted from the blue light source device 300 passes through the second dichroic mirror 148 to be incident on the collective lens 173.

The light source side optical system 170 includes the collective lens 173, the light tunnel 175, the collective lens 178, a light axis changing mirror 181, a collective lens 183, and a condenser lens 195. The condenser lens 195 emits image light which is emitted from the display device 51 which is disposed on a side of the condenser lens 195 which faces the back panel 13 towards the projection side optical system 220, and therefore, the condenser lens 195 is also understood to be part of the projection side optical system 220.

The collective lens 173 is disposed near the light tunnel 175, and this collective lens 173 collects light source light to the incident port of the light tunnel 175. Thus, light in the red wavelength range, light in the green wavelength range and light in the blue wavelength range are connected by the collective lens 173 to be incident on the light tunnel 175. Pencils of light which are incident on the light tunnel 175 are distributed uniformly in terms of intensity, whereby the pencils of light whose intensities are disturbed uniformly are emitted from the light tunnel 175.

The light axis changing mirror 181 is disposed on an optical axis of the light tunnel 175 on a side of the collective lens 178 which faces the back panel 13. The pencils of light emerging from an emerging port of the light tunnel 175 are collected by the collective lens 178, whereafter the direction of axes of the pencils of light is changed in the direction of the left side panel 15 by the light axis changing mirror 181.

The pencils of light which are reflected by the light axis changing mirror 181 are collected by the collective lens 183 and are then shone onto the display device 51 at a predetermined angle via the condenser lens 195 by the shining mirror 185. A heat sink 190 is provided on a side of the display device 51 which faces the back panel 13, so that the display device 51 which is a DMD is cooled by this heat sink 190.

The pencils of light, which are light source lights, shone on to image forming surfaces of the display device 51 by the light source side optical system 170 are reflected on image forming surfaces of the display device 51 and are then projected on a screen via the projection side optical system 220 as projected light. Here, the projection side optical system 220 includes the condenser lens 195, the movable lens group 235, and a fixed lens group 225. The movable lens group 235 is made to be moved by the lens motor. The movable lens group 235 and the fixed lens group 225 are incorporated in fixed lens barrels. Thus, the fixed lens barrel which incorporates the movable lens group 235 therein is formed into a variable-focus lens which enables zooming and focusing adjustments.

By configuring the projector 10 in the way described heretofore, when lights are emitted from the individual light source devices at different timings, lights in the red, green and blue wavelength ranges are sequentially incident on the collective lens 173 and the light tunnel 175 via the light guiding optical system 140 and are then incident on the display device 51 via the light source side optical system 170. Then, the DMD, which is the display device 51 of the projector 10, displays the red, green and blue lights in a time sharing fashion according to data, whereby a color image can be projected on to the screen.

Next, referring to FIG. 4, the luminescent plate 101 of the luminescent plate device 100 will be described.

Figure 4:
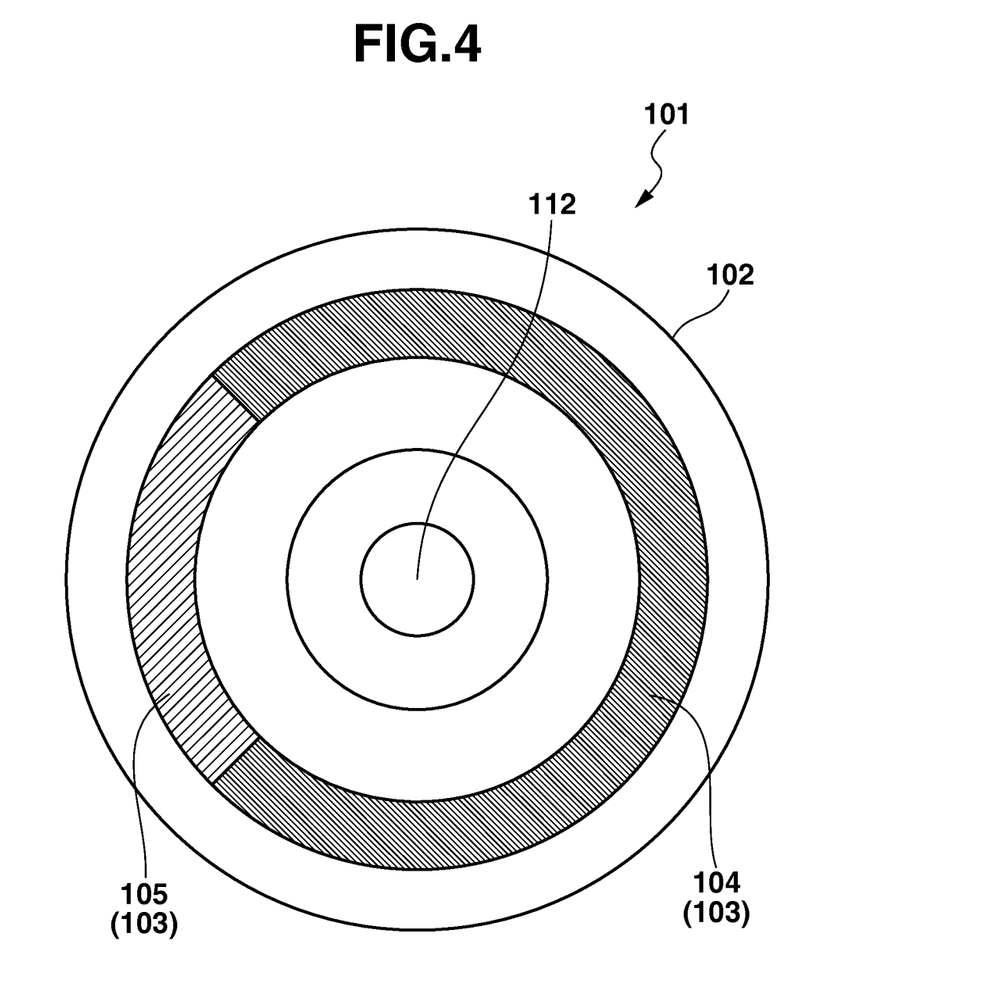
FIG. 4 is a schematic front view of a luminescent plate of the projector according to the embodiment of the invention.

FIG. 4 is a schematic front view of the luminescent plate 101 according to this embodiment. The luminescent plate 101 is connected to a motor shaft 12 of the motor 110 and is driven to rotate by the motor 110. A base material 102 of the luminescent plate 101 is made of a metallic base material of copper or aluminum and is formed into a circular disc. An annular groove is formed on a surface of the base material which faces the excitation light shining device 70. A bottom portion of the groove is mirror finished by silver deposition or the like, and a luminescent light emitting area 103 is formed on the mirror finished surface.

The luminescent light emitting area 103 is formed by a first luminescent light emitting area 104 and a second luminescent light emitting area 105. The first luminescent light emitting area 104 and the second luminescent light emitting area 105 are provided end to end annularly. The first luminescent light emitting area 104 is formed to have a surface area which is larger than that of the second luminescent light emitting area 105.

A resin mixed luminescent material layer of the first luminescent light emitting area 104 contains at least a luminescent material and a resin binder. Then, other constituent material such as a dispersant which assists in dispersing the luminescent material, a reflecting agent which assists in reflecting light and the like are mixed with the luminescent material and the resin binder as required. Then, the resulting mixture of powder is thermosetting-treated to form the resin mixed luminescent material layer. Then, the resin mixed luminescent material layer formed in the way described above is provided in the annular groove on the base material 102, whereby the first luminescent light emitting area 104 is formed. As the resin binder of the resin mixed luminescent material layer, a silicon resin, an epoxy resin and polyethylene, polypropylene and polystyrene based resins which are all light transmitting resins and mixtures thereof are used. In this embodiment, the resin binder is formed as a resin mixed luminescent material layer which contains at least the silicon resin.

The resin mixed luminescent material layer formed in the way described above is given a high shining efficiency of excitation light and a high emitting efficiency of luminescent material by the light transmitting resin binder, whereby a highly bright luminescent light can be obtained. However, the resin binder has a heat-resistant temperature of the order of about 180° C., and hence, when excitation light is shone on to the same location for a predetermined length of time, there are fears that the resin binder is burned. Consequently, in shining excitation light on to the first luminescent light emitting area 104, the luminescent plate device 100 causes the motor 110 to drive the luminescent plate 101 so as to keep it rotating so that the excitation light is restricted from being shone on to a specific location continuously.

On the other hand, the second luminescent light emitting area 105 is formed by providing a luminescent material which contains no resin binder in the annular groove on the base material 102. The luminescent material which contains no resin binder is formed by forming a luminescent material which is sintered together with an inorganic material or a crystallized luminescent material into a plate shape. The luminescent material containing no resin binder which is formed by being sintered together with the inorganic material is formed by sintering a mixed powder material which contains at least a luminescent material and an inorganic material and into which other materials such as a dispersant which assists in dispersing the luminescent material and a reflecting agent which assists in reflecting light are mixed as required. As the inorganic material, alumina, aluminum nitride and other ceramic materials or mixtures thereof are used. As the crystallized luminescent material, a columnar luminescent material crystallized as a scintillator or a crystalline luminescent material a film of which is deposited on a glass base material using the MOCVS method is used.

The luminescent material containing no resin binder which is formed in the way described above uses no resin binder and hence has a high heat-resistant temperature of about 1700° C. Consequently, in shining excitation light on to the second luminescent light emitting area 105, the luminescent plate device 100 stops the motor 110 so as not to be driven to rotate, allowing excitation light to be kept shone on to the second luminescent light emitting area 105.

By taking one example to describe this, a thickness of the resin mixed luminescent material layer of the first luminescent light emitting area 104 is 125 μm, whereas a thickness of the second luminescent light emitting area 105 is 500 μm. As this occurs, in the case of the resin mixed luminescent material layer of the first luminescent light emitting area 104, since light is collected by the resin mixed luminescent material layer, the surface of the resin mixed luminescent material layer coincides with the focal point of the light. However, the thickness of the second luminescent light emitting area 105 is thicker than the thickness of the resin mixed luminescent material layer of the first luminescent light emitting area 104, and therefore, the light is not focused on the surface of the second luminescent light emitting area 105, and no light is collected, unevenness in color becomes difficult to be produced. Additionally, the problem of heat can also be reduced.

In shining excitation light on to the second luminescent light emitting area 105, although excitation light can be shone on to the second luminescent light emitting area 105 without driving to rotate the luminescent plate 101, it is better to avoid shining continuously excitation light on to a specific location on the resin mixed luminescent material layer by oscillating the luminescent plate 101 by means of the motor 110. As a matter of course, a front surface of the first luminescent light emitting area 104 and a front surface of the second luminescent light emitting area 105 may be made level with each other by providing a rear surface of the second luminescent light emitting area 105 at a different level from a rear surface of the first luminescent light emitting area 104.

Additionally, as has been described before, the projector 10 of this embodiment has the plurality of projection modes. Here, a projection mode in which a projection with a high luminance is performed in a projection place whose circumference is bright is referred to as a first projection mode. A projection mode in which a quiet projection with a low luminance is performed in a projection place whose circumference is dark by reducing the level of noise generated from the projector 10 is referred to as a second projection mode. Then, as has been described before, the luminescent plate control device is made up of the light source control circuit 41 and the luminescent plate control module 44 (refer to FIG. 2) and has the first projection mode and the second projection mode.

The projector 10 which is configured in the way described above operates as follows. In the event that the projector 10 is used in the first projection mode, in order to obtain highly bright luminescent light, excitation light is emitted from the excitation light shining device 70 while its intensity is strengthened by increasing the value of a drive current. The luminescent plate 101 is driven to rotate at constant speeds by the motor 10.

The luminescent plate control device (the light source control circuit 41 and the luminescent plate control module 44) detects a rotating position of the luminescent plate 101 by a position sensor or the like, not shown, which is provided in the luminescent plate device 100 and drives the excitation light shining device 70 only while the first luminescent light emitting area 104 is being positioned on an optical path of excitation light to thereby shine excitation light. Namely, the excitation light shining device 70 is controlled by the luminescent plate control device so that excitation light is shone on only to the first luminescent light emitting area 104.

In driving the luminescent plate 101 to rotate continuously to thereby cause excitation light to be shone, it is preferable that excitation light is shone on only to the first luminescent light emitting area 104 as described above. This is because since the color tone of light in the green wavelength range differs between luminescent light in the green wavelength range which is emitted from the first luminescent light emitting area 104 and luminescent light in the green wavelength range which is emitted from the second luminescent light emitting area 105, the tone of light in the green wavelength range of projected light changes in the middle of projection.

On the other hand, in the event that the projector 10 is used in the second projection mode, excitation light is emitted from the excitation light shining device 70 while its intensity is reduce by reducing the value of the drive current. The luminescent plate 101 is stopped in a rotating position where the second luminescent light emitting area 105 is positioned on the optical path of excitation light by the luminescent plate control module 44. Then, excitation light is shone on to the second luminescent light emitting area 105 by controlling the excitation light shining device 70 by the light source control circuit 41. Namely, excitation light is shone on to the second luminescent light emitting area 105 by the luminescent plate control device (the light source control circuit 41 and the luminescent plate control module 44).

Consequently, luminescent light of low luminance can be obtained by shining excitation light of low intensity. Further, since the motor 110 is stopped, it is possible to suppress the generation of noises such as an wind noise generated from the luminescent plate device 100, a high-frequency noise of the motor 110 and the like. Further, the luminescent material which contains no resin binder in the second luminescent light emitting area 105 has the high heat-resistant temperature, whereby the cooling fan 261 can also be stopped, thereby reducing the level of noise further. Since the motor 110 and the cooling fan 261 are not driven, it is possible to obtain an energy saving effect while lowering the output of the excitation light source.

In addition, since the degree of dispersion of luminescent material in the luminescent material of the second luminescent light emitting area 105 which contains no resin binder differs, there may be generated the biased luminescent light. As this occurs, the luminescent plate device 100 can be controlled to be driven by the luminescent plate control device so as to move minutely the luminescent plate 101 or oscillate the luminescent plate 101 within a range where excitation light is shone on to the second luminescent light emitting area 105. Shining excitation light on to the second luminescent light emitting area 105 by moving the luminescent plate 101 in the way described above moves a spot on the second luminescent light emitting area 105 where excitation light is shone relatively within the range of the second luminescent light emitting area 105, whereby the deviation of the luminescent light is reduced.

Figure 5:
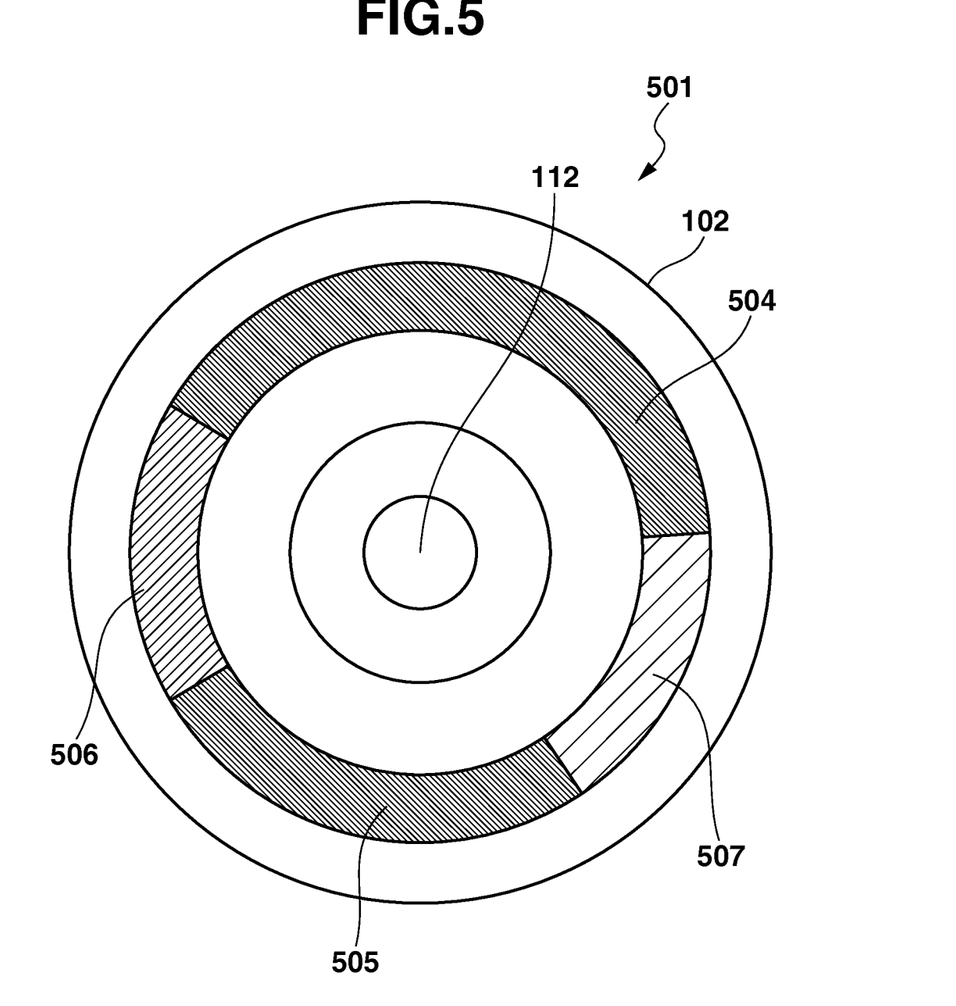
FIG. 5 is a schematic front view showing another luminescent plate of another projector according to another embodiment of the invention.

Next, a different embodiment of the invention will be described. FIG. 5 is a schematic front view of a luminescent plate 501 according to the different embodiment of the invention. Like reference numerals will be given to like portions to those described in the previous embodiment, so that the description thereof will be omitted here.

In a luminescent plate 501 of this embodiment, a luminescent light emitting area is formed by first luminescent light emitting areas 504, 505 and second luminescent light emitting areas 506, 507. As with the embodiment described above, a resin mixed luminescent material layer is provided in each of the first luminescent light emitting areas 504, 505. Here, the same resin molded luminescent material layers of the same color tone are provided in the first luminescent light emitting area 504 and the first luminescent light emitting area 505.

Luminescent materials including no resin binder are provided in the second luminescent light emitting areas 506, 507. Here, luminescent materials containing no resin binder which emit luminescent lights of different color tones are provided in the second luminescent light emitting area 506 and the second luminescent light emitting area 507. The second luminescent light emitting area 506 and the second luminescent light emitting area 507 can selectively be used according to a selected projection mode.

With the luminescent plate 501 of this embodiment, too, in the case of a first projection mode in which a projection with a high luminance needs to be performed, a luminescent plate device 100 and an excitation light shining device 70 are controlled by a luminescent plate control device so that excitation light is shone on only to the first luminescent light emitting areas 504 and 505. On the other hand, in the case of a second projection mode in which a quiet projection with a low luminance is performed, a motor 110 is stopped by the luminescent plate control device so that excitation light is shone on to the second luminescent light emitting are 506 or the second luminescent light emitting area 507.

In this embodiment, while the second luminescent light emitting areas 506, 507 are formed by the two different types of luminescent materials containing no resin binder which emit the luminescent lights of different color tones, the second luminescent light emitting areas can also be formed by three or more types of luminescent materials containing no resin binder which emit luminescent lights of different colortones.

Thus, while the embodiments of the invention have been described heretofore, the invention is not limited thereto and hence can be carried out by adding various alterations or modifications. For example, the luminescent plates 101, 501 can not only be driven to rotate but also be driven by various driving systems. Specifically, a configuration may be adopted in which a first luminescent material area and a second luminescent material area are formed into a straight line and a driving device is made to reciprocate them in a sliding fashion.

As has been described heretofore, the light source unit 60 according to the embodiment of the invention includes the excitation light shining device 70 which is the excitation light source and the luminescent plate 101 on to which excitation light emitted from the excitation light shining device 70 is shone. The luminescent plate 101 has as the luminescent light emitting area the first luminescent light emitting area 104 on which the resin mixed luminescent material layer is provided and the second luminescent light emitting area 105 on which the luminescent material containing no resin binder is provided.

With the light source unit 60 configured in the way described above, when excitation light is shone on to the first luminescent light emitting area 104, luminescent light of high luminance can be obtained, whereas when excitation light is shone on to the second luminescent light emitting area 105, luminescent light of low luminance can be obtained. Additionally, since the second luminescent light emitting area 105 has the high heat resistance, although the first luminescent light emitting area 104 has to be moved by driving the luminescent plate 101 to rotate or slide when excitation light is shone on thereto, the luminescent plate 101 does not have to be driven to rotate or slide so as to move the spot on the second luminescent light emitting area 105 where excitation light is shone. Consequently, since the noise generated when the luminescent plate 101 is driven to rotate or slide can be eliminated, a quiet projection with low luminance can be executed in a dark place, and further, an energy saving projection can also be executed.

The luminescent material containing no resin binder is formed by sintering the mixed material containing at least the luminescent material and the inorganic material. This enables the luminescent material containing no resin binder to be formed through sintering, whereby the luminescent material containing no resin binder with the high heat-resistant temperature can be obtained.

The luminescent material containing no resin binder is formed by sintering the inorganic material containing at least alumina and the luminescent material together. This enables the luminescent material containing no resin binder to be obtained which has the high hardness and the high durability.

Additionally, the luminescent material containing no resin binder is formed by sintering the inorganic material containing at least aluminum nitride and the luminescent material together. This enables the heat dissipating effect to be enhanced further because the luminescent material containing no resin binder which is so formed includes aluminum nitride having a high thermal conductivity. The luminescent material containing no resin binder which is so formed has a strong bending strength and can reduce the thermal expansion coefficient. This can restrict the generation of a deformation therein by excitation light shone on thereto, whereby it is possible to obtain the luminescent material containing no resin binder which is highly durable.

The luminescent material containing no resin binder is formed by crystallizing the luminescent material. Since this enables the luminescent material containing no resin binder to be obtained which is highly transparent, it is possible to enhance the optical transformation efficiency.

The resin binder which makes up the resin mixed luminescent material layer contains at least the silicon resin. This enables the formation of the resin mixed luminescent material layer having a high light transmissivity, whereby it is possible to obtain the luminescent light of higher luminance by enhancing the light emission efficiency. Additionally, the thermal expansion of the resin mixed luminescent material layer can be suppressed to a low level, whereby it is possible to reduce the risk of the resin mixed luminescent material layer being dislocated from the luminescent plate 101 due to the resin mixed luminescent material layer being expanded by excitation light shone on thereto.

The first luminescent light emitting layer 104 is formed to have the surface area which is larger than that of the second luminescent light emitting area 105. This enables the increase in the surface area of the spot on to which excitation light is shone when excitation light is shone on to the first luminescent light emitting area 104, whereby it is possible to extend the time during which excitation light is shone on per unit area. Thus, it is possible to enhance further the burning prevention effect.

The second luminescent light emitting area 105 includes the plurality of luminescent materials containing no resin binder which emit the luminescent lights of different color tones. This enables the color tones of the luminescent lights to be changed which are emitted from the second luminescent light emitting area 105 as the light source, whereby it is possible to obtain the projected lights corresponding to the various projection modes.

The luminescent plate control device which controls the luminescent plate 101 of the luminescent plate device 100 has the first projection mode in which the luminescent plate device 100 is driven so that excitation light is shone on to the first luminescent light emitting area and the second projection mode in which the luminescent plate device 100 is stopped or moved minutely so that excitation light is shone on to the second luminescent light emitting area 105. This can provide the light source unit which can deal with the first projection mode which is the projection mode with high luminance and the second projection mode which is the quiet, energy saving projection mode with low luminance.

The luminescent plate 101 is formed as the luminescent wheel, and the luminescent plate device 100 includes the motor 101. The luminescent light emitting area 103 is formed into the annular shape. By adopting this configuration, by driving the luminescent plate 101 to rotate, the spot where excitation light is shone can be moved relative to the first luminescent light emitting area 104. Consequently, it is possible to form the device including the luminescent plate 101 by the simple configuration.

Thus, the light source unit 60 is formed which includes the excitation light shining device 70 which is made up of the blue laser diodes 71, the luminescent plate device 100 which emits light in the green wavelength range, the red light source device 120 which is made up of the red light emitting diode, and the blue light source device 300 which is made up of the blue laser diode. By adopting this configuration, the light source unit 60 can be provided which has the three primary light source of high luminance and the quiet, energy saving three primary light source of low luminance for the projection mode which is executed with low luminance.

The projector 10 is made up of the light source unit 60, the display device 51, the projection side optical system 220, and the projector control unit. Thus, it is possible to provide the projector 10 which includes the low-luminance, quiet and low-consumed-power projection mode and the high-luminance projection mode.

The embodiments that have been described heretofore are presented as the examples and are not intended to limit the scope of the invention. These novel embodiments can be carried out in other various forms, and various omissions, replacements and/or modifications can be made thereto without departing from the spirit and scope of the invention. The resulting embodiments or their modifications are included in the spirit and scope of the invention and are also included in the scope of inventions claimed under claims and their equivalents.

What is claimed is:

1. A light source unit comprising:
an excitation light source; and
a luminescent plate which includes a first luminescent light emitting area on which a resin mixed luminescent material layer containing a resin binder is provided and a second luminescent light emitting area on which a luminescent material containing no resin binder is provided, on to which first luminescent light emitting area and second luminescent light emitting area excitation light from the excitation light source is shone.

2. The light source unit according to claim 1, wherein the luminescent material containing no resin binder is formed by sintering a mixed material containing at least a luminescent material and an inorganic material.

3. The light source unit according to claim 2, wherein the inorganic material contains alumina or aluminum nitride, and wherein
the resin binder contains a silicone resin.

4. The light source unit according to claim 1, wherein the luminescent material containing no resin binder is formed by crystallizing a luminescent material.

5. The light source unit according to claim 2, wherein the luminescent material containing no resin binder is formed by crystallizing a luminescent material.

6. The light source unit according to claim 1, wherein the first luminescent light emitting area has a surface area which is larger than that of the second luminescent light emitting area.

7. The light source unit according to claim 2, wherein the first luminescent light emitting area has a surface area which is larger than that of the second luminescent light emitting area.

8. The light source unit according to claim 1, wherein a plurality of luminescent materials containing no resin binder which emit luminescent lights of different color tones when the excitation light is shone on thereto are provided in the second luminescent light emitting area.

9. The light source unit according to claim 2, wherein a plurality of luminescent materials containing no resin binder which emit luminescent lights of different color tones when the excitation light is shone on thereto are provided in the second luminescent light emitting area.

10. The light source unit according to claim 1, wherein the luminescent plate is formed so as to be driven by a luminescent plate device, wherein
the luminescent plate device is controlled by a luminescent plate control device, and wherein the luminescent plate control device has a first projection mode in which the luminescent plate device is driven to cause the excitation light to be shone on to the first luminescent light emitting area and a second projection mode in which the luminescent plate device is stopped or moved minutely to cause the excitation light to be shone on to the second luminescent light emitting area.

11. The light source unit according to claim 2, wherein the luminescent plate is formed so as to be driven by a luminescent plate device, wherein
the luminescent plate device is controlled by a luminescent plate control device, and wherein
the luminescent plate control device has a first projection mode in which the luminescent plate device is driven to cause the excitation light to be shone on to the first luminescent light emitting area and a second projection mode in which the luminescent plate device is stopped or moved minutely to cause the excitation light to be shone on to the second luminescent light emitting area.

12. The light source unit according to claim 7, wherein the luminescent plate is a luminescent wheel, wherein
the luminescent plate device has a motor which drives the luminescent wheel, and wherein
the first luminescent light emitting area and the second luminescent light emitting area are formed into an annular shape.

13. The light source unit according to claim 1, further comprising:
a red light source device which is made up of a red light emitting diode which emits light in the red wavelength range; and
a blue light source device which is made up of a blue light emitting diode which emits light in the blue wavelength range;
wherein, the excitation light source includes a blue laser diode which emits light in the blue wavelength range,
wherein, the luminescent light emitting areas are made up of the first luminescent light emitting area and the second luminescent light emitting area both of which emit luminescent light in the green wavelength range.

14. The light source unit according to claim 2, further comprising:
a red light source device which is made up of a red light emitting diode which emits light in the red wavelength range; and
a blue light source device which is made up of a blue light emitting diode which emits light in the blue wavelength range;
wherein, the excitation light source includes a blue laser diode which emits light in the blue wavelength range,
wherein the luminescent light emitting areas are made up of the first luminescent light emitting area and the second luminescent light emitting area both of which emit luminescent light in the green wavelength range.

15. The light source unit according to claim 3, further comprising:
a red light source device which is made up of a red light emitting diode which emits light in the red wavelength range; and
a blue light source device which is made up of a blue light emitting diode which emits light in the blue wavelength range;
wherein, the excitation light source includes a blue laser diode which emits light in the blue wavelength range,
wherein, the luminescent light emitting areas are made up of the first luminescent light emitting area and the second luminescent light emitting area both of which emit luminescent light in the green wavelength range.

16. The light source unit according to claim 4, further comprising:
a red light source device which is made up of a red light emitting diode which emits light in the red wavelength range; and
a blue light source device which is made up of a blue light emitting diode which emits light in the blue wavelength range;
wherein, the excitation light source includes a blue laser diode which emits light in the blue wavelength range,
wherein, the luminescent light emitting areas are made up of the first luminescent light emitting area and the second luminescent light emitting area both of which emit luminescent light in the green wavelength range.

17. A projector comprising:
a light source unit comprising:
an excitation light source, and
a luminescent plate which includes a first luminescent light emitting area on which a resin mixed luminescent material layer containing a resin binder is provided and a second luminescent light emitting area on which a luminescent material containing no resin binder is provided, on to which first luminescent light emitting area and second luminescent light emitting area excitation light from the excitation light source is shone;
a display device on to which light source light from the light source unit is shone to thereby form image light;
a projection side optical system which projects the image light emitted from the display device on to a screen; and
a projector control unit which controls the display device and the light source unit.

* * * * *